March 25, 1952  P. R. ADAMS  2,590,080
CATHODE-RAY TUBE SCREEN FILTER
Filed July 9, 1945  4 Sheets-Sheet 2
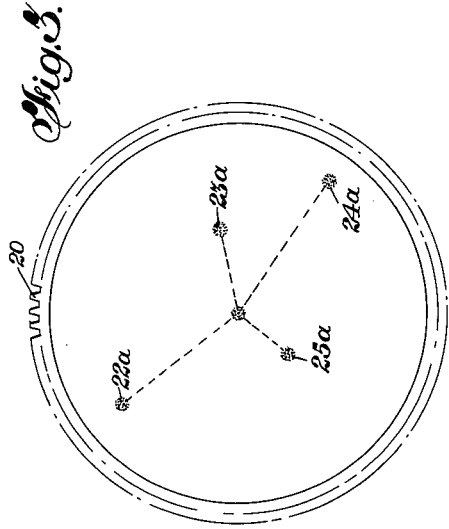
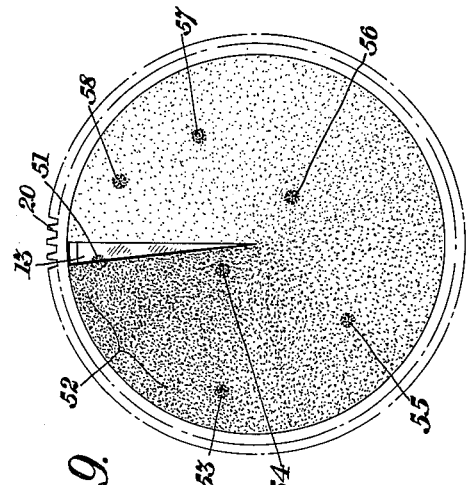
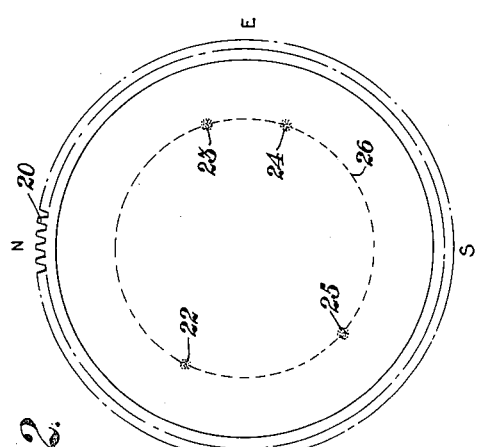
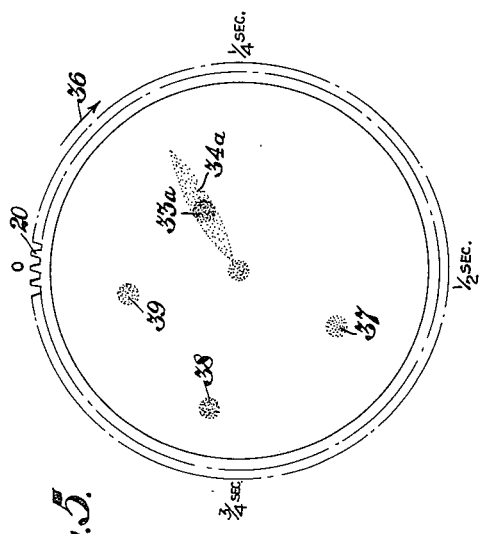
INVENTOR.
PAUL R. ADAMS
BY
ATTORNEY

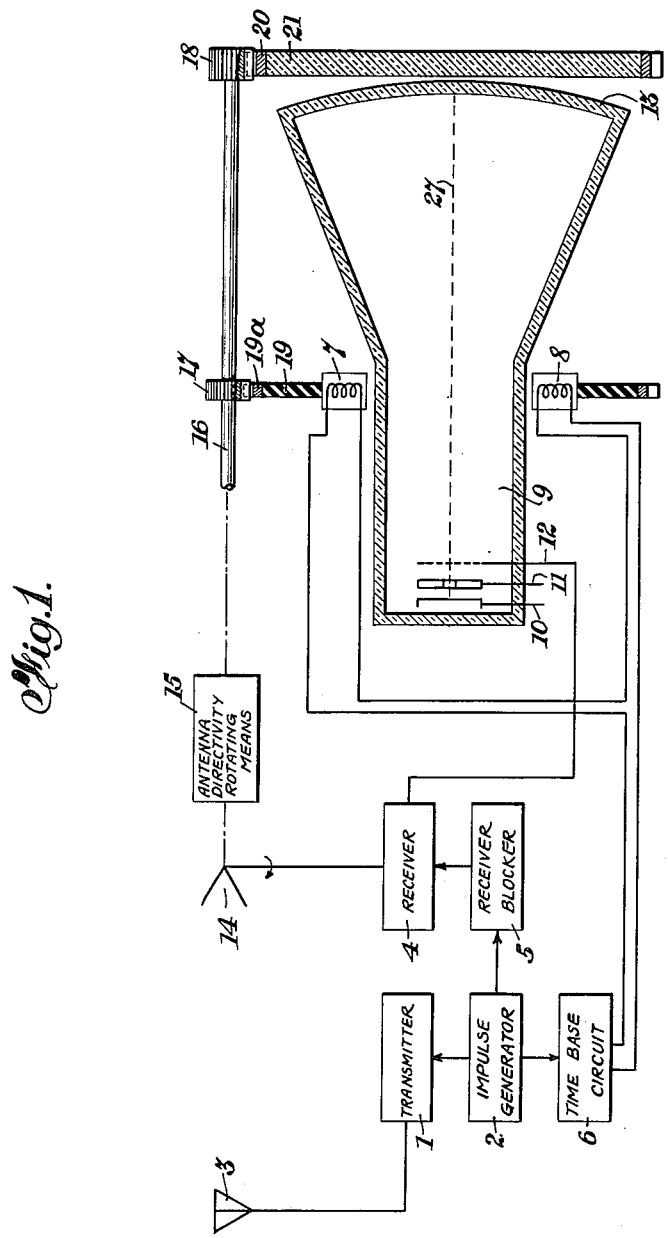

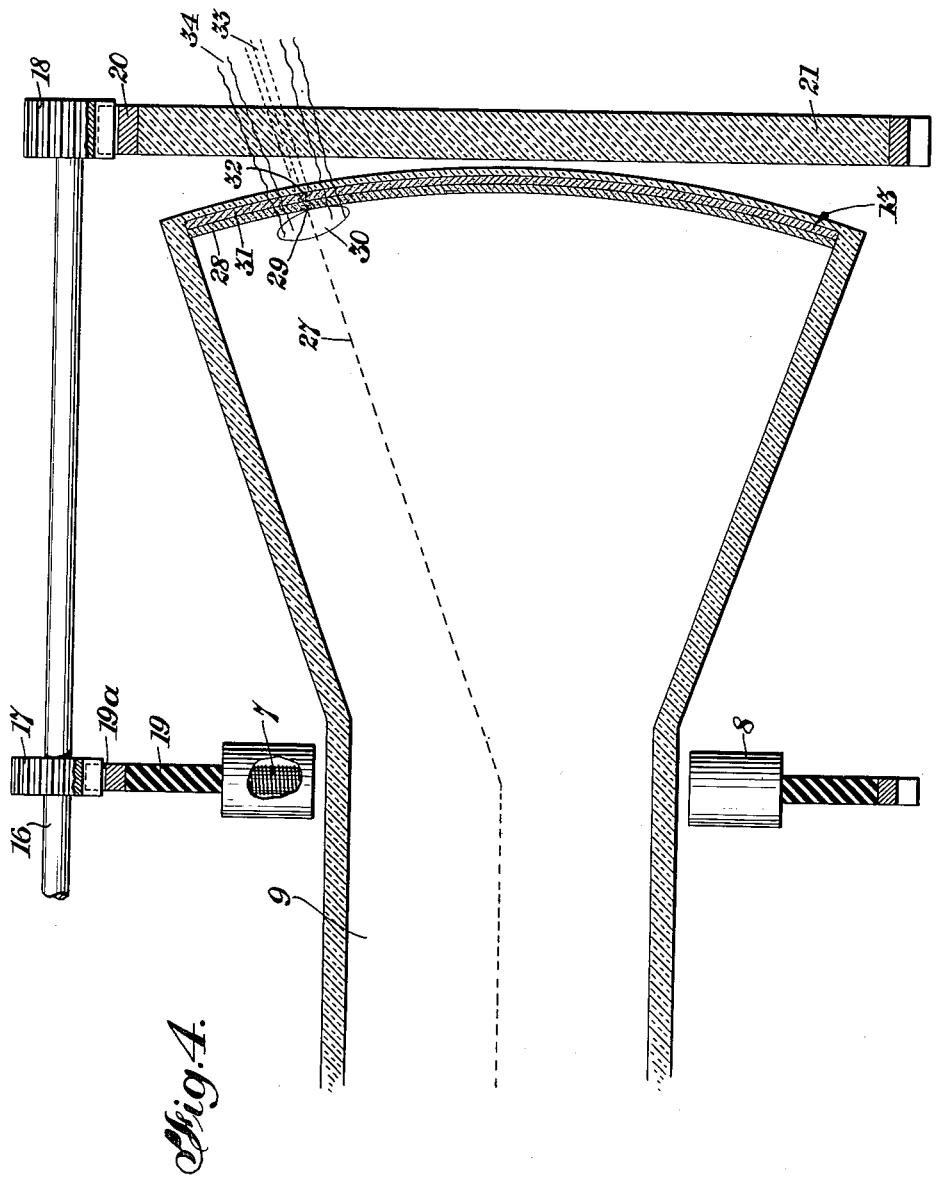

March 25, 1952  P. R. ADAMS  2,590,080
CATHODE-RAY TUBE SCREEN FILTER
Filed July 9, 1945  4 Sheets-Sheet 4
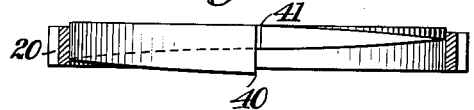
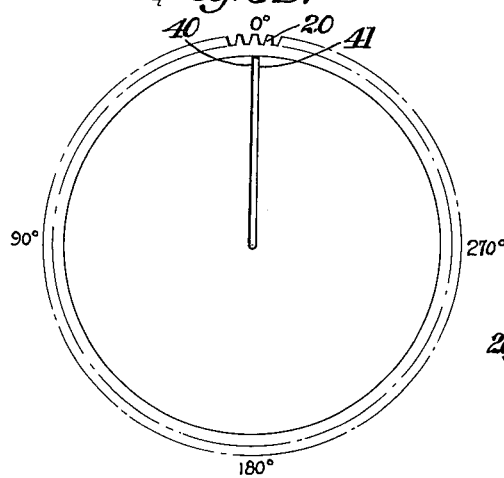
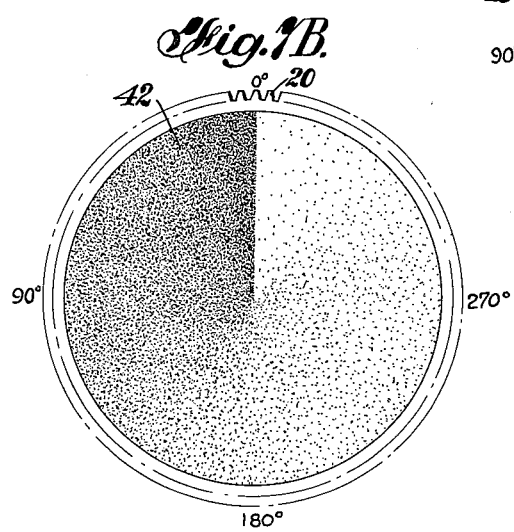
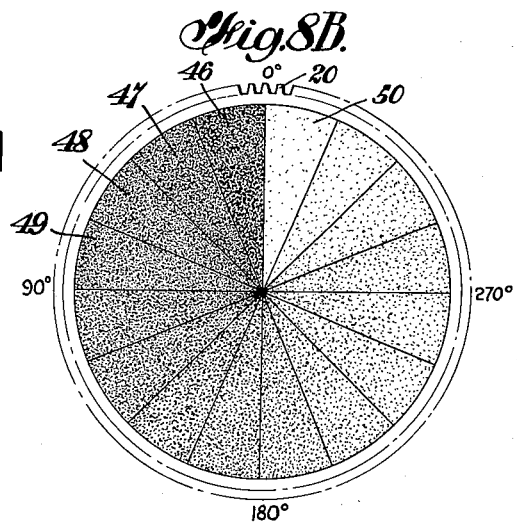
INVENTOR.
PAUL R. ADAMS
BY
ATTORNEY Patented Mar. 25, 1952

2,590,080

UNITED STATES PATENT OFFICE 2,590,080

CATHODE-RAY TUBE SCREEN FILTER

Paul R. Adams, Cranford, N. J., assignor to Federal Telephone and Radio Corporation, New York, N. Y., a corporation of Delaware Application July 9, 1945, Serial No. 603,932

11 Claims. (Cl. 343—11)

This invention relates to filters for luminescent screens of cathode ray oscillograph indicators, and more particularly to methods of and apparatus for securing uniform brilliance of spot luminescence produced by a radially and circularly displaced electron beam impinging on such a luminescent screen of a cathode ray tube.

The versatile cathode ray tube has been utilized as indicating means in many radio positioning systems and radio direction finding circuits. In most cases the indicator resolves impressed signals into visible intelligence constituting distance and direction of a reflecting object. Various methods are known whereby such distinctive signals may be impressed on elements of a cathode ray oscillograph indicator, one such system being hereinafter described. The resultant pattern on the screen of the cathode ray tube may be considered generally to be formed by the electron beam from the electron gun being displaced radially and circularly, this electron beam being propagated only in response to impressed signals.

In order to secure the directional indication, a rotatable directional antenna is coupled through a suitable circuit in one form to rotatable magnetic deflecting coils mounted about the neck of the cathode ray tube, thereby providing a circularly deflected trace on the screen that may be calibrated to indicate directivity.

Distance of the object being "ranged" may be indicated by the radial displacement of incoming signals if adequate intensity calibration is performed. Otherwise, a transmitter is used to radiate a pulse of energy, the reflected pulse from the object being passed through receiver means to control the flow of an electron beam. In conjunction with this system a circuit is used to provide an indication of the instant of transmitting an impulse and the instant of receiving a reflection of the impulse. Thus, either the magnitude of radial deflection or the distance between indications on the screen of the cathode ray tube will correspond to the distance of the object.

Due to the means employed to secure a directivity reading, some of the luminescent spots will be of greater brilliance than others with respect to time, for the circular sweep of the electron beam may be relatively slow, say in the order of one revolution per second, and in this case the luminescent spot indications produced by the beam at the beginning of a revolution become dimmer as the beam rotates around the screen. Consequently, the brilliance of various indications varies about the surface of the screen. Also an object producing an indication which shows up on the screen at the beginning of a revolution may have passed out of the field of vision of the apparatus being used, yet the indication may still be retained on the screen for at least a part of a second revolution of the beam notwithstanding the fact that the beam does not produce in its second revolution an indication of the presence of this object.

Considerable difficulty is experienced in securing sufficient brilliance of the screen of the cathode ray tube indicating device to afford good visibility in fairly strong light, or in daylight. If the intensity of the beam is increased, the production of ultra violet fluorescence and the higher frequency visible light waves within the tube results in a brilliant blue line being produced radially of the screen along the trace of the beam. This is objectionable since the brilliance of this blue line tends to render indications (spots), left by the afterglow when the beam has passed on, harder to read. According to a feature of my invention, this blue light formed in a line radially of the screen may be dimmed in brilliance or totally obscured by adjusting the rotatable filter position with respect to this blue line. This may be accomplished by different means. A preferred embodiment, however, accomplishes this by means of a filter the denseness of which varies in a given manner.

When the most dense portion of the filter is adjusted to overlie this blue line, the spots on other portions of the screen will then be visible through the less dense portions of the filter. In addition, the filtering action over any one area of the screen progressively decreases as the filter is rotated, thereby compensating for the loss in brilliance of spots as the afterglow fades. As hereinbefore mentioned this is possible when the beam is rotated relatively slowly in its orbit, say once per second.

It is, accordingly, an object of my invention to provide means to secure uniform brilliance of indications on the screen of a cathode ray tube indicating device as viewed at any one instant.

It is a further object of my invention to provide means to render the brilliance of indications on the screen of a cathode ray tube indicating device sufficient to be easily observed in fairly strong light, or daylight.

It is a still further object of my invention to provide means to reduce to a minimum any background visible light radiation produced on the interior surfaces of the cathode ray tube that might tend to obscure the indications on the screen of the cathode ray tube indicating device.

It is an additional object of my invention to provide means to substantially or totally obscure any blue light radiation produced in a line radially of the screen of a cathode ray tube indicating device produced through excessive ultra violet fluorescence and generation of higher frequency visible light radiation within the cathode ray tube indicating device.

It is also an additional object of my invention to provide means to substantially prevent the retention of an indication on the viewing screen of a cathode ray tube indication device for more than one revolution of the rotatable electron beam after the object so shown has passed out of the field of vision of the apparatus being used.

A better understanding of my invention and the objects and features thereof may be had by referring to the following detailed description and the accompanying drawings, in which:

Fig. 1 is a schematic circuit diagram partly in block form of an indicating system employing the principles of my invention;

Figs. 2 and 3 represent indications obtained on the screen of a cathode ray tube of Fig. 1 without the filter of my invention;

Fig. 4 is an enlarged sectional view of the screen of a cathode ray tube;

Fig. 5 is an indication obtained with a high intensity beam cathode ray tube;

Figs. 6a, 7a and 8a are side views of possible filters;

Figs. 6b, 7b and 8b are plan views of possible filters; and

Fig. 9 is a representation of the indications obtained on the screen of a cathode ray tube as seen through a filter according to my invention.

Turning first to Fig. 1, there is shown a known circuit for applying signals to a cathode ray tube indicating device. The system as shown may be used to secure directivity readings in a radio direction finding system or aircraft or other object locating finding system. In either case the readings on the screen will be formed by a circularly and radially displaced electron beam.

A transmitter 1 is actuated by an impulse generator 2 to produce a pulse of radio frequency energy which is radiated from antenna 3. During the short period of transmission receiver 4 is blocked against receiving any radiation from the transmitter 1 by means of receiver blocker 5 which is, in turn, actuated by the impulse generator 2. Time base circuit 6 is connected to the deflecting coils 7 and 8 which are positioned closely about the neck of the cathode ray tube shown generally at 9, including the components of an electron gun such as cathode 10, concentrating electrode 11 and control grid 12 which is fed by receiver 4. The screen 13 of the cathode ray tube is of a type composed of two layers, shown in detail in Fig. 4. Electrons propagated from the electron gun will be deflected by potentials applied to deflecting coils 7 and 8, the resulting pattern being shown on the screen 13. All this is well known in the art and is shown here merely by way of background for a specific application of my invention.

As will be seen in Fig. 1, a directional and rotatable antenna 14 is used to feed receiver 4, the rotation being secured through a motor or other antenna directivity rotating means 15. A shaft 16 is connected to rotating means 15 to interconnect gears 17 and 18 which in turn bear against and drive in synchronous rotation a supporting spider 19 through ring gear 19a for deflection coils 7 and 8, and a ring gear 20 mounted about the circumference of a circular filter 21 which is thereby caused to rotate in front of screen 13 in synchronism with the rotation of antenna 14.

Now let us consider the apparatus in use as a direction finding system. Pulses sent out from transmitter 1 will be reflected back from reflecting objects toward antenna 14, which will receive these pulses only if its position in rotation allows the directive property of the antenna to pass a signal to receiver 4. Upon a signal reaching the receiver, the control grid in the cathode rap tube allows a beam of electrons to flow toward screen 13, the duration of propagation being dependent upon pulse rate and set characteristics in the receiver. Meanwhile, if a constant potential is applied to the rotating deflecting coils 7 and 8, a circular displacement of the beam results, the spot appearing on the screen in a quadrant of a circle relative to the quadrant being scanned by the antenna 14, thereby rendering an indication of the direction of the object reflecting the transmitted impulse of energy.

In a similar manner a varying potential may be applied to deflecting coils 7 and 8 through the time base circuit 6 to give a radial sweep of the beam in its orbit. Any indication appearing on the screen will thereby be displaced radially as well, the radial deflection being a function of time, or a measure between the time of pulse transmission and the time of its appearance on the screen as a reflection.

Fig. 2 is a view of the screen and "spot" indications when the deflecting coils 7, 8 have a constant potential applied to produce a circular sweep. The spots 22, 23, 24 and 25 are all in different quadrants of the circle, giving a relative bearing of the reflecting object when the screen is oriented with the directional antenna. All spots appear on the circular path of the constantly deflected electron beam, the imaginary trace of the beam being shown as a dotted line 26.

When the time base circuit 6 applies a varying potential to the deflecting coils 7, 8, the spots will be spaced radially as well as circularly thereby providing an indication of distance as well as directivity. Such a pattern is shown in Fig. 3, wherein spots 22a, 23a, 24a, 25a are displaced varying distances from the zero point of deflection 31. The radial spacing allows estimation of the range of the reflecting object.

Fig. 4 will give a clearer understanding of the operation of an electron beam 27 impinging on a cathode ray tube screen comprising two layers of suitable phosphors, such as layer 28 which is a phosphor capable of fluorescing under the impact of electrons to produce a spot of ultra violet radiation shown generally at 29 and a glowing area 30 of the higher frequency visible light rays usually of a brilliant blue color. Secondly layer 31 of a different material converts the high frequency fluorescence of spot 29 to a lower frequency spot of light 32 on layer 31. The lower frequency light radiates rays 33, rendering the spot visible to the viewer, while some rays 34 radiate outwardly from the glowing area 30, their brilliant blue color tending to obscure the spot from rays 33 which we wish to see. If the tube in use is used under a fairly strong light, increasing operation of the tube to produce a visible spot under such light also increases the blue light. In Fig. 5 there is shown such a situation, with a spot 33a almost obscured by a bright blue line 34a of an appreciable width.

In certain detection systems the rate of rotation of the beam may be relatively slow; perhaps about one revolution per second. In this case the spots produced by the beam at the beginning of the revolution are considerably dimmer than those being produced at other points as the beam rotates around the screen. Consequently, the brilliance of various spots varies considerably about the surface of the screen. In Fig. 5, arrow 36 indicates the direction of rotation of beam 27. It will be clear that the spot 33a produced in the first one-quarter second of a revolution will be dimmer than spots 37, 38 or 39 produced later in the cycle.

According to the retentivity of layer 31 of the screen it is possible that spot 33a will have faded, but will still be visible upon the passing of the beam in a succeeding revolution. Spot 33a may have indicated the presence of an object which has actually passed out of the field of vision of the apparatus being used by the time the succeeding revolution of the beam has commenced. It will be clear that such retentivity in this case will tend to load the screen and therefore prove disadvantageous.

According to an embodiment of my invention, a circular filter 21 is caused to rotate in front of screen 13 whereby uniform brilliance of indicating spots on screen 13 may be secured. The filter is almost opaque in one area, decreasing in density until complete transparency obtains. Fig. 6a shows a side view of a filter in the form of a light wedge. The material used is of uniform opaqueness, the degree of maximum opaqueness being just sufficient to reduce transmission of spot luminescence from screen 13 to the desired intensity through the thickest part. It will be clear that the portion of maximum opaqueness must be aligned to overlie the point of impingement of electron beam 27 on screen 13, and synchronism maintained with the rotation of the beam circularly about the screen. The thickness of the wedge should be greatest at point 40 (or 0° on the circumference of the circular wedge), decreasing in thickness circularly to a minimum value at point 41 (or 360° on the circumference of the circular wedge). Fig. 6b is a plan view of this type of filter.

Another possible method of construction of a circular filter is shown at Fig. 7a in which a circular plate of uniform thickness is used with the degree of opaqueness being greatest at point 42, decreasing circularly to permit passage of light in progressively greater amounts counter clockwise, as shown in Fig. 7b. Still another possible form might be that shown in Fig. 8a, wherein sectors or segments of a circle, each of a relatively lesser density are assembled to form a circle of progressive areas of opaqueness, such as areas 46, 47, 48, 49, decreasing to approximate transparency in area 50.

Each of the above-mentioned filters performs essentially the same function, namely, causing spot indications appearing on the screen of a cathode ray tube to be of substantially uniform brilliance, even though individual spots about the screen at any one instant may vary greatly in intensity. Also, any blue line produced radially of the screen will be under the denser portion of the filter, eliminating or at least greatly minimizing the objectionable blue line, while the progressive filtering action of the filter will render any spots visible, with substantially equal brilliance.

As a further advantage of my invention, any spots such as 51 in Fig. 9 which may have been made at the commencement of one revolution will have actually faded considerably on the screen, and will disappear completely when covered again by the more dense portion 52 of a circular filter. An indication of the object which produced this spot will therefore not be carried over for a second revolution or more. Thus, if the object which produced this spot has passed out of the field of view of the receiver, a false reading will not be shown.

By the use of the rotatable light filter a much higher concentration of energy within the tube and a more brilliant series of spots may be produced, since any brilliant spots lying under the dense area of the filter will be dimmed sufficiently by the progressive filtering action to prevent their causing undesirable glare to the observer's eye, yet the decrease in density of the filter will render them easily read throughout the full area of the screen. As in Fig. 9, all spots such as 53, 54, 55, 56, 57, 58, no matter where they lie, are of substantially equal brilliance.

While I have described certain specific structures by way of illustration, many variations in the details thereof will be apparent to those versed in the art, without departing from my invention. Although I have described the principles of my invention in connection with certain specific apparatus, it must be understood that this description is by way of example only and not as a limitation on the scope of my invention as set forth in the objects and the accompanying claims.

I claim:

1. A filter for the luminescent screen of a cathode ray tube having a rotatable electron beam comprising a circular light wedge of progressively decreasing color filtering action in a circumferential direction from one radius thereof, drive means to rotate said circular light wedge about its axis in synchronism with the circular displacement of said electron beam, and means to support and align said circular light wedge adjacent and substantially parallel to said luminescent screen.

2. A filter for use with the screen of a rotatable electron beam indicator comprising a rotatable member of progressively increasing density about its face with the areas of maximum and minimum density lying adjacent each other along a radial line from the center of rotation of said member, and drive means to rotate said screen about its center of rotation in synchronism with the electron beam of said indicator.

3. A filter for use with a luminescent screen of a cathode ray tube indicating device having a rotatable electron beam, comprising a rotatable member of progressively increasing density about its face with the areas of maximum and minimum density lying adjacent each other along a radial line from the center of rotation of said member, drive means to rotate said member about its center of rotation in synchronism with said electron beam, and means to maintain said rotatable member with the area of maximum density thereof in a given relation with respect to the rotated position of said beam.

4. A filter for use with a rotatable electron beam indicator having a luminescent screen, comprising a rotatable translucent member of progressively increasing density circularly about its face with the areas of maximum and minimum density lying adjacent each other along a radial line from the center of rotation of said member, drive means to rotate said translucent screen about its center of rotation in synchronism with the electron beam of said indicator, and means to support and align said rotatable translucent member in a plane parallel to the plane of said luminescent screen.

5. In a cathode ray oscillograph indicator having a luminescent screen and an associated rotatable electron beam producing an indication trace progressively decreasing in brilliance with respect to time; luminescent screen filter means comprising a circular light wedge having a decreasing filtering action in a circular direction from one radius thereof, means to align said circular light wedge filter for rotary movement about the axis of rotation of said beam with its highest filtering portion overlying the point of impingement of said electron beam on said screen, and drive means to rotate said circular light wedge in synchronism with the circular displacement of the electron beam.

6. In a cathode ray oscillograph indicator having a luminescent screen and an associated rotatable electron beam indicator, a circular color filter comprising a rotatable translucent member of progressively increasing color density about its face with the areas of maximum and minimum density lying adjacent each other along a radial line from the center of rotation of said member, drive means to rotate said screen about its center of rotation in synchronism with the electron beam of said cathode ray oscillograph indicator, and means to maintain the area of maximum density of said rotatable translucent member in an overlying relation to the area of said luminescent screen being impinged by said beam.

7. In a position indicating system having a rotatable cathode ray tube indicator, a rotatable directive antenna, means for rotating the electron beam of said cathode ray tube synchronously with said antenna and means for controlling said electron beam in accordance with received signals; means for effectively equalizing the brilliance of indications made on the screen of said cathode ray tube in response to received signals comprising a filter disposed over the screen of said cathode ray tube, and means for rotating said filter in synchronism with the electron beam of said cathode ray tube, the filtering density of said filter being gradually decreased in a circumferential direction from a radius of maximum density.

8. In a cathode ray tube indicating device having a screen comprised of two layers, a rotatable beam which impinges upon the first layer of said screen to produce both an ultra violet spot of high intensity and a high frequency visible light radiation of relatively lower intensity, said ultra violet spot producing rays which pass through said first layer and react with the second layer of said screen converting said rays into luminous light spots, said high frequency visible light from said first layer passing through both of said layers; the improvement comprising a filter of high filtering action in one area and of decreasing filtering action in a given direction therefrom, drive means to move said filter in synchronism with the circular displacement of said electron beam, the portion of highest filtering action of said wedge overlying the point of impingement of said beam on said screen so that said high frequency visible light of low intensity will be substantially obscured, allowing said luminous light spots from said second layer to be transmitted through the portions of lower filtering action, thereby rendering said luminous light visible to the viewer.

9. In a cathode ray tube indicating device having a screen comprised of two layers, a rotatable beam which impinges upon the first layer of said screen to produce both an ultra violet spot of high intensity and a blue light radiation of relatively lower intensity, said ultra violet spot producing rays which pass through said first layer and react with the second layer of said screen converting said rays into luminous light; said blue light from said first layer passing through both of said layers; the improvement comprising a rotatable filter disposed crosswise of said screen, said filter being of progressively increasing density about its face with the areas of maximum and minimum density lying adjacent each other along a radial line from the center of rotation of said filter, drive means to rotate said filter about its center of rotation in synchronism with the circular movement of said electron beam, and means aligning said filter with its portion of greatest density overlying the point of impingement of said beam on said screen, thereby obscuring said blue light produced at said first layer of said screen, the less dense portions of said filter allowing said luminous light from said second layer to be visible to the viewer.

10. In an object detection system in which periodically recurrent impulse energy is directionally radiated in a generally circular sweep having receiver means responsive to reflections of said impulse energy for indicating the direction and distance of reflecting objects; said receiver means including a cathode ray indicating means having electron beam control means including circular sweep control means and radial deflection means, means for operating said circular sweep control means in synchronism with said generally circular sweep of said directional radiation, means coupled to said radial deflection means for producing a radial deflection corresponding to the delay between a transmitted impulse and a received reflection thereof, and means in said cathode ray indicating means for providing an indication of the direction and distance of said reflecting objects in accordance with the position of the cathode ray beam under displacement control of said deflection means, said cathode ray indicating means including a luminescent screen responsive to impingement of said electron beam, a filter comprising a member having a filtering density decreased in a circumferential direction from an area of maximum density along one side of a given radius to an area of minimum density along the opposite side of said radius, drive means to rotate said member about its said axis in synchronism with the circular displacement of said electron beam, and means to align the area of highest filtering density of said member with the part of the screen being impinged by said beam.

11. In an object detection system in which periodically recurrent impulse energy is directionally radiated in a generally circular sweep having receiver means responsive to reflections of said impulse energy for indicating the direction and distance of reflecting objects, said receiver means including a cathode ray indicating means having electron beam control means including circular sweep control means and radial deflection means, means for operating said circular sweep control means in synchronism with said generally circular sweep of said directional radiation, means coupled to said radial deflection means for producing a radial deflection corresponding to the delay between a transmitted impulse and a received reflection thereof, and means in said cathode ray indicating means for providing an indication of the direction and distance of said reflecting objects in accordance with the position of the cathode ray beam under displacement control of said deflection means, said cathode ray indicating means including a luminescent screen responsive to impingement of said electron beam, a filter comprising a member having a filtering density decreased in a circumferential direction from an area of maximum density along one side of a given radius to an area of minimum density along the oppostie side of said radius, drive means to rotate said member in synchronism with the circular movement of said electron beam, said member being disposed substantially coaxially with respect to the circular movement of said beam, and means to align the area of highest filtering density of said member with the part of the screen being impinged by said beam so that with the area of maximum density overlying the point of impingement of said beam on said cathode ray tube screen said member obscures substantially, during succeeding revolutions, spots made on the cathode ray tubes screen in a preceding revolution of said beam, thereby preventing an indication of position of an object that may have moved or passed out of the field of vision of the apparatus from being rendered visible for more than one revolution of said filter member.

PAUL R. ADAMS.

REFERENCES CITED

The following references are of record in the file of this patent:

UNITED STATES PATENTS

| Number | Name | Date |
| --- | --- | --- |
| 2,208,209 | Busignies | July 16, 1940 |
| 2,428,351 | Ayres | Oct. 7, 1947 |
| 2,483,432 | Richardson | Oct. 4, 1949 |